(12) United States Patent
Ailamaki et al.

(10) Patent No.: US 9,329,899 B2
(45) Date of Patent: May 3, 2016

(54) PARALLEL EXECUTION OF PARSED QUERY BASED ON A CONCURRENCY LEVEL CORRESPONDING TO AN AVERAGE NUMBER OF AVAILABLE WORKER THREADS

(71) Applicant: SAP AG, Walldorf (DE)

(72) Inventors: Anastasia Ailamaki, Geneva (CH); Tobias Scheuer, Walldorf (DE); Iraklis Psaroudakis, Geneva (CH); Norman May, Walldorf (DE)

(73) Assignee: SAP SE, Walldorf (DE)

( * ) Notice: Subject to any disclaimer, the term of this patent is extended or adjusted under 35 U.S.C. 154(b) by 423 days.

(21) Appl. No.: 13/925,629

(22) Filed: Jun. 24, 2013

(65) Prior Publication Data

US 2014/0380322 A1  Dec. 25, 2014

(51) Int. Cl.
  *G06F 9/50* (2006.01)
  *G06F 17/30* (2006.01)
  *G06F 9/48* (2006.01)

(52) U.S. Cl.
  CPC ............ *G06F 9/5038* (2013.01); *G06F 9/4843* (2013.01); *G06F 9/5066* (2013.01); *G06F 17/30445* (2013.01); *G06F 2209/504* (2013.01); *G06F 2209/5017* (2013.01); *G06F 2209/5018* (2013.01)

(58) Field of Classification Search
  None
  See application file for complete search history.

(56) References Cited

U.S. PATENT DOCUMENTS

| | | | |
|---|---|---|---|
| 5,526,521 A | 6/1996 | Fitch et al. | |
| 5,742,806 A * | 4/1998 | Reiner | G06F 17/30445 |
| 5,752,031 A | 5/1998 | Cutler et al. | |
| 5,768,594 A | 6/1998 | Blelloch et al. | |
| 5,781,775 A | 7/1998 | Ueno | |
| 7,100,164 B1 | 8/2006 | Edwards | |
| 7,421,694 B2 | 9/2008 | Gosalia et al. | |
| 7,424,712 B1 | 9/2008 | Sistare et al. | |
| 7,565,651 B1 | 7/2009 | Carey | |
| 7,707,512 B2 | 4/2010 | Peters | |
| 7,774,298 B2 | 8/2010 | Trivedi et al. | |
| 8,412,549 B2 | 4/2013 | Graeber et al. | |

(Continued)

OTHER PUBLICATIONS

Intel articles—Granularity and Parallel Performance. retrieved from: http://software.intel.com/en-us/articles/granularity-and-parallel-performance/ Printed on Apr. 9, 2013.

(Continued)

*Primary Examiner* — Benjamin Wu
(74) *Attorney, Agent, or Firm* — Fountainhead Law Group PC

(57) ABSTRACT

Systems and method for a task scheduler with dynamic adjustment of concurrency levels and task granularity are disclosed for improved execution of highly concurrent analytical and transactional systems. The task scheduler can avoid both over commitment and underutilization of computing resources by monitoring and controlling the number of active worker threads. The number of active worker threads can be adapted to avoid underutilization of computing resources by giving the OS control of additional worker threads processing blocked application tasks. The task scheduler can dynamically determine a number of parallel operations for a particular task based on the number of available threads. The number of available worker threads can be determined based on the average availability of worker threads in the recent history of the application. Based on the number of available worker threads, the partitionable operation can be partitioned into a number of sub operations and executed in parallel.

20 Claims, 6 Drawing Sheets

(56) References Cited

U.S. PATENT DOCUMENTS

| | | | |
|---|---|---|---|
| 2003/0135621 A1 | 7/2003 | Romagnoli | |
| 2006/0090161 A1* | 4/2006 | Bodas | G06F 9/5044 718/100 |
| 2006/0218123 A1* | 9/2006 | Chowdhuri | G06F 17/30445 |
| 2009/0271385 A1* | 10/2009 | Krishnamoorthy | G06F 17/30445 |
| 2010/0042631 A1* | 2/2010 | Shuf | G06F 17/30445 707/713 |
| 2010/0169887 A1 | 7/2010 | Waas | |
| 2010/0251257 A1* | 9/2010 | Kim | G06F 9/5027 718/105 |
| 2010/0312762 A1* | 12/2010 | Yan | G06F 17/30445 707/716 |
| 2011/0125730 A1* | 5/2011 | Bordawekar | G06F 17/30445 707/718 |
| 2011/0239017 A1 | 9/2011 | Zomaya et al. | |
| 2012/0198369 A1 | 8/2012 | Sorin et al. | |
| 2013/0117752 A1 | 5/2013 | Li et al. | |
| 2013/0212085 A1* | 8/2013 | Nica | G06F 17/30445 707/718 |
| 2013/0262443 A1* | 10/2013 | Leida | G06F 17/30427 707/722 |
| 2014/0282579 A1* | 9/2014 | Smiley | G06F 9/5027 718/104 |

OTHER PUBLICATIONS

Internet article, Intel Thread Building Blocks. retrieved from: http://threadingbuildingblocks.org. Printed on Apr. 9, 2013.
Internet article, OpenMP API for Parallel Programming. retrieved from: Http://openmp.org Mar. 11-Mar. 15, 2013.
TPC-C Benchmark: Standard Specification, Rev. 5.11. Transaction Processing Performance Council. Feb. 2010.
TPC-H Benchmark: Standard Specification, Rev. 2.14.3. Transaction Processing Performance Council. 2011.
U. A. Acar et al. "The data locality of work stealing." SPAA '00. 2000.
A. Ailamaki et al. "DBMSs on a Modern Processor: Where Does Time Go?" Proceedings of the 25th VLDB Conference, 1999.
E. Ayguade et al., "A Proposal for Task Parallelism in OpenMP." IWOMP, 2008.
S. Blanas et al. "Design and evaluation of main memory hash join algorithms for multi-core cpus." SIGMOD, 2011.
R. D. Blumofe et al. "Cilk: An ecient multithreaded runtime system." Journal of Parallel and Distributed Computing, 1995.
D.-K. Chen et al. "The impact of synchronization and granularity on parallel systems." ISCA, 1990.
J. Cieslewicz et al. "Data partitioning on chip multiprocessors." DaMoN, 2008. Proceedings of the Fourth International Workshop on Data Management on New Hardware.
A. Duran et al. "Evaluation of OpenMP task scheduling strategies." IWOMP, 2008, pp. 100-110.
Faerber et al. "The SAP HANA Database { An Architecture Overview." IEEE Data Eng. Bull., 35(1):28{33, 2012.
R. Hoffmann et al. "Performance evaluation of task pools based on hardware synchronization." IEEE, Supercomputing, 2004.
F. R. Johnson et al. "Decoupling contention management from scheduling." ASPLOS, 2010.
J. Lee et al. "SAP HANA Distributed In-Memory Database System: Transaction, Session, and Metadata Management." In ICDE, 2013.
C. Li et al. "Quantifying the cost of context switch." In Workshop on Experimental computer science, 2007.
E. Mohr et al. "Lazy task creation: a technique for increasing the granularity of parallel programs." LFP '90 Proceedings of the 1990 ACM Conference on LISP and Functional Programming., pp. 185-197. 1990.
A. Morf, "Snapshot isolation in distributed column-stores." Master's thesis, ETH Zurich, 2011.
G. J. Narlikar, "Scheduling threads for low space requirement and good locality." SPAA, 1999.
S. L. Olivier et al. "OpenMP task scheduling strategies for multicore NUMA systems." Int. J. High Perform. Comput. Appl., 26(2):110{124, May 2012.
V. Sikka et al. "Efficient transaction processing in SAP HANA database: the end of a column store myth." SIGMOD, 2012.
D. N. Turner et al. "On the granularity of divide-and-conquer parallelism." In Workshop on Functional Programming, 1995.
Extended European Search Report dated Apr. 9, 2015 from corresponding European application No. 14002087.6-1957 / 2819009.

\* cited by examiner

PARALLEL EXECUTION OF PARSED QUERY BASED ON A CONCURRENCY LEVEL CORRESPONDING TO AN AVERAGE NUMBER OF AVAILABLE WORKER THREADS

BACKGROUND

Unless otherwise indicated herein, the approaches described in this section are not prior art to the claims in this application and are not admitted to be prior art by inclusion in this section.

The present invention relates to task scheduling for highly concurrent analytical and transactional workloads and, in particular, to systems and methods for task scheduling in database management systems (DBMS). Task scheduling usually involves using a number of threads to process tasks. As a thread completes one task, or otherwise becomes available, it can move to processing the next task waiting to be processed. Such scheduling systems are typically effective in leveraging the ability of modern multicore processors to process tasks in parallel. In general, a task scheduler activates a number of threads equal to the number of cores in the processor. Such conventional task schedulers avoid performance degradations associated with creating an excessive numbers of threads, such as unnecessary context switches and cache thrashing incurred by typical time-sharing policies of an operating system (OS) scheduler that attempts to balance large numbers of threads among a limited number of available cores. However, blindly bundling DBMS operations into tasks can result in sub optimal usage of computing resources, thus diminishing the overall performance of the DBMS.

One measure of the performance of a DBMS is its ability to handle an ever-increasing number of online analytical processing (OLAP) and online transactional processing (OLTP) queries over growing data sets. To increase the efficacy of the DBMS in processing multiple OLAP and OLTP queries, many systems have implemented techniques for processing the queries in parallel using multi-core processors. DBMS operations involve highly concurrent contending OLTP workloads with many blocking tasks and highly concurrent OLAP workloads that can, if left unchecked, result in the creation of excessive numbers of tasks. Simply issuing logical threads and leaving the scheduling to the OS tends to lead to higher thread creation costs and numerous context switches incurred by most OS time-sharing policies that balances a large numbers of threads among a limited number of available cores. Accordingly, implementing traditional task schedulers within a DBMS environment often results in higher task scheduling costs that can diminish overall performance.

SUMMARY

Embodiments of the present invention improve task scheduling of highly concurrent analytical and transactional workloads in multicore computer systems. In particular, the present disclosure describes systems and methods for task scheduling for OLTP and OLAP tasks in a database management system.

One embodiment of the present disclosure includes a method, implemented in a computer system, comprising: activating a plurality of worker threads, receiving a query, processing the query in a first thread in the plurality of threads to generate a parsing task associated with the query, parsing the query based on the parsing task to generate an execution plan comprising a plurality of ordered operations for answering the query, generating a task graph comprising a plurality of task nodes corresponding to the plurality of ordered operations, based on the execution plan, identifying a first task node in the plurality of task nodes corresponding to a first ordered operation in the plurality of ordered operations determined be partitionable into sub operations that can be executed in parallel, generating a concurrency level value that corresponds to an availability of worker threads in the plurality of worker threads, and generating a plurality of partitioned tasks that can be executed in parallel based on the first task node and the concurrency level value. The concurrency level value is the upper limit for the number of the plurality of partitioned tasks. The computer system may include a multicore processor having a plurality of processing cores. In such scenarios, the number of threads activated may be based on the number of processing cores.

In one embodiment, the method further comprises executing the plurality of partitioned tasks in the plurality of worker threads, executing the plurality of task nodes in the plurality of worker threads, and tracking the availability of worker threads while the plurality of partitioned tasks and the plurality of task nodes are executing.

In one embodiment, generating the concurrency level value comprises calculating an average number of available worker threads in the plurality of worker threads over a period of time.

In one embodiment, generating the concurrency level value is also based on a state of the query.

In one embodiment, the query is an SQL query for information contained in a database.

In one embodiment, the method further comprises instantiating a data base management system (DBMS) application, wherein activating the plurality of worker threads comprises activating the plurality of worker threads inside the DBMS application, determining that at least one of the plurality of worker threads is blocked, and allocating an additional worker thread at an operating system level of the computer system.

In one embodiment, allocating the additional worker thread comprises activating a previously inactive worker thread or creating a new worker thread.

Another embodiment of the present disclosure includes non-transitory computer readable medium comprising instructions, that when executed by a processor cause the processor to be configured for: activating a plurality of worker threads, receiving a query, processing the query in a first thread in the plurality of threads to generate a parsing task associated with the query, parsing the query based on the parsing task to generate an execution plan comprising a plurality of ordered operations for answering the query, generating a task graph comprising a plurality of task nodes corresponding to the plurality of ordered operations, based on the execution plan, identifying a first task node in the plurality of task nodes corresponding to a first ordered operation in the plurality of ordered operations determined be partitionable into sub operations that can be executed in parallel, generating a concurrency level value that corresponds to an availability of worker threads in the plurality of worker threads, and generating a plurality of partitioned tasks that can be executed in parallel based on the first task node and the concurrency level value, wherein the concurrency level value is the upper limit for the number of partitioned tasks.

Another embodiment of the present disclosure includes system comprising: a computer processor, a non-transitory computer readable medium coupled to the processor and comprising instructions, that when executed by the computer processor cause the computer processor to be configured to: activate a plurality of worker threads, receive a query, process the query in a first thread in the plurality of threads to generate a parsing task associated with the query, parse the query based on the parsing task to generate an execution plan comprising a plurality of ordered operations for answering the query, generate a task graph comprising a plurality of task nodes corresponding to the plurality of ordered operations, based on the execution plan, identify a first task node in the plurality of task nodes corresponding to a first ordered operation in the plurality of ordered operations determined be partitionable into sub operations that can be executed in parallel, generate a concurrency level value that corresponds to an availability of worker threads in the plurality of worker threads, and generate a plurality of partitioned tasks that can be executed in parallel based on the first task node and the concurrency level value, wherein the concurrency level value is the upper limit for the number of partitioned tasks.

The following detailed description and accompanying drawings provide a better understanding of the nature and advantages of the present invention.

DETAILED DESCRIPTION

Figure 1:
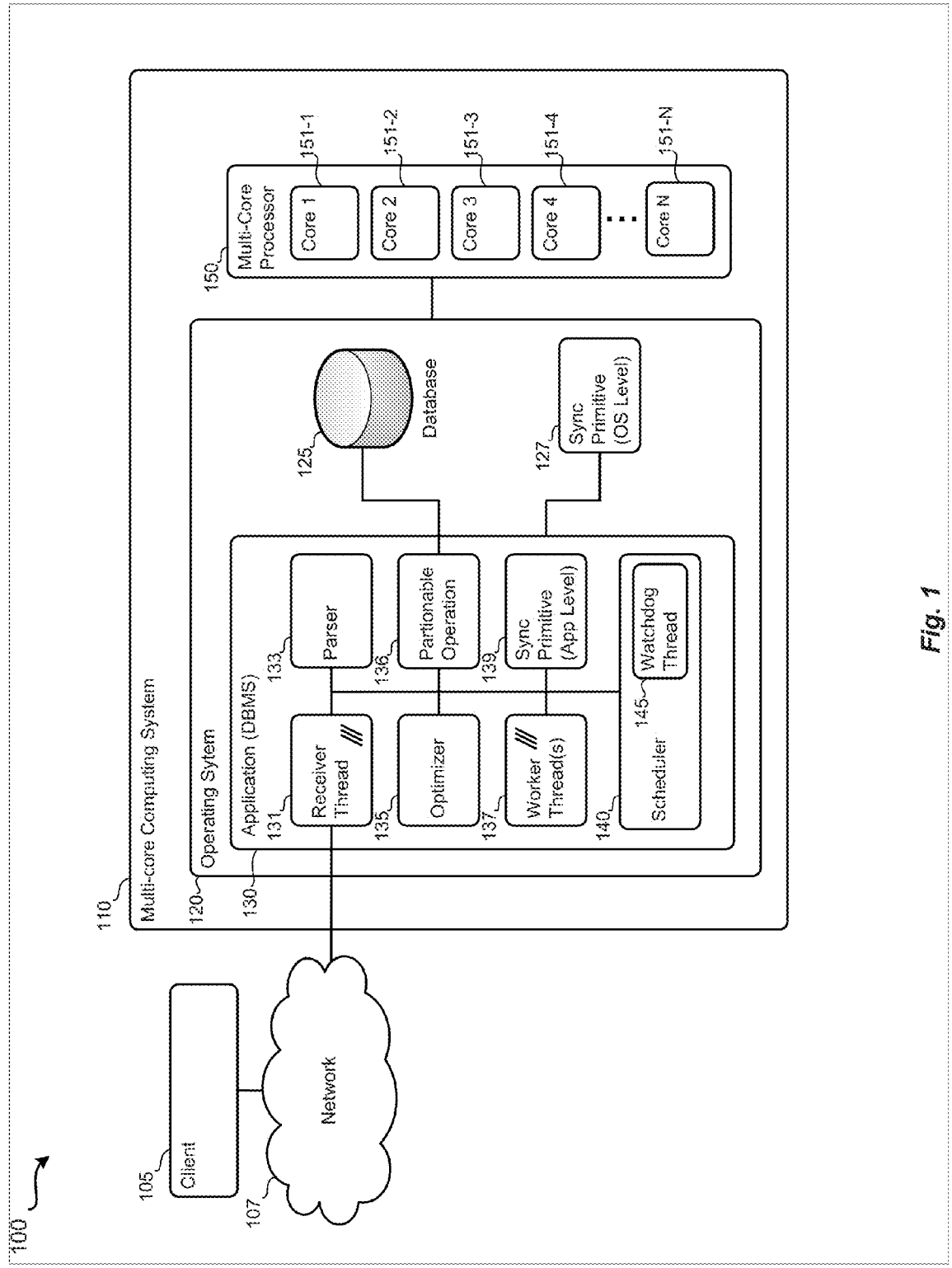
FIG. 1 is a schematic diagram of a system with dynamic adjustment of concurrency levels and dynamic adjustment of task granularity, according to embodiments of the present disclosure.

Described herein are techniques for systems and methods for operating a task scheduler with adjustable number of worker threads and adjustable task granularity for parallel execution of highly concurrently analytical and transactional processes. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for a task scheduler in highly concurrent analytical and transactional applications and systems. In some embodiments, the task scheduler can be added to an existing application with minimal code modification. For example, various embodiments of the task scheduler may be implemented in new and existing database management systems (DBMS) as an add-on or simple upgrade. In one embodiment, the task scheduler implemented in the DBMS can avoid both over commitment and underutilization of computing resources by restricting the number of active worker threads to the number of cores in the multicore processor of the system executing the DBMS. To further improve on this technique, in one embodiment, the number of active worker threads, also referred to herein as the "concurrency level", can be dynamically adapted to avoid underutilization of computing resources by giving the OS control of additional worker threads processing blocked tasks. Due to the nature of OLTP operations, many DBMS operations are often blocked due to internal data synchronization requirements. Accordingly, by ceding control of blocked worker threads, embodiments of the present disclosure can facilitate full utilization of computing resources, e.g., cores of a multicore processor. Cooperating with the OS by voluntarily adjusting the concurrency level, and giving control of the additional worker threads to the OS when needed to saturate computing resources, is referred to herein as dynamic adjustment of concurrency levels.

In other embodiments, the task scheduler can dynamically determine and generate a number of parallel operations for a particular task based on the number of unused, or otherwise available, worker threads. For instance, the speed with which an OLAP aggregation operation over a given data set is executed can be increased by partitioning the task into multiple worker threads. Multiple tasks for aggregating smaller partitions of the data set may be completed in parallel in multiple worker threads using multiple cores to reduce the execution time. A task that may be subdivided into sub operations that can be executed in parallel is referred to herein as a "partionable operation". Thus, in some embodiments when it is determined that a particular task includes a partitionable operation, the task scheduler can determine the number of currently available worker threads, or a number of worker threads that is expected to be available in the near future, on which to execute the partitioned operations. In one embodiment, the number of available worker threads can be determined based on the average availability of worker threads in the recent history of the application. The average availability may be determined using an exponential or historical average analysis of recently available worker threads. Based on the number of available worker threads, the partitionable operation can be partitioned into a number of corresponding sub operations from which multiple tasks can be generated. The tasks corresponding to the sub operations can then be issued and wait to be processed by one or more available worker threads. The process of determining the number of sub operations into which a partitionable operation is segmented during runtime, is referred to herein as the dynamic adjustment of task granularity. Specific examples of system architectures and data flows will now be described in detail in reference to the figures to illustrate various embodiments of the present disclosure.

FIG. 1 is a block diagram of a system 100 that may include dynamic adjustment concurrency levels and dynamic adjustment of task granularity, according to various embodiments of the present disclosure. As shown, system 100 may include a multicore computer system 110 in communication with one or more client computers 105 through network 107. In such embodiments, the multicore computing system 110 may exchange messages and/or commands with the client 105 through network 107 using various types of electronic communication media and protocols. The multicore computing system 110 may include an operating system 120 and/or an application 130 generated by one or more sets of computer executable code executed using one or more of the cores 151 of the multicore processor 150. In such configurations, the operating system 120 and/or the application 130 may leverage the parallel processing capabilities of the multicore processor 150 to increase the performance. For example, the multicore computing system 110 may receive a query for information stored in the database 125. Based on the specifics of the query, the operating system 120 or application 130 may generate, initiate, and process one or more operations on data in the database 125 using multiple cores 151 of the multicore processor 150 in parallel to answer the query more quickly than using only a single core 151.

In one embodiment, the application 130 may include a DBMS that operates on database 125. In such embodiments, each operation of a particular query may correspond to a particular task to be executed by the application 130 or the operating system 120 using one or more concurrently active worker threads 137. Accordingly, when the operating system 120 or the application 130 are initialized or activated, they can instantiate, or otherwise activate, a number of worker threads based on the number of cores 151 in the multicore processor 150. In various embodiments, the number of threads activated at the operating system or application level can be less than, equal to, or greater than the number of cores 151 in the multicore processor 150. One particular goal of the present disclosure is to describe systems and methods that may be used to optimally allocate the computing resources, represented here by the cores 151, by intelligently balancing the number of received tasks with the number of worker threads 137 and cores 151.

In one specific example, the application 130, can receive a query from the client 105 through the network 107 using a dedicated receiver thread 131. The receiver thread 131 may be activated before, during, or after the query is received from the client 105. Similarly, the application 130 may also activate or create a number of worker threads 137 before, during, or after a query is received at the multicore computing system 110. When the query is received by the receiver thread 131, a task can be created for handling the query and sent to the scheduler 140 for processing. When a worker thread becomes available, the scheduler 140 can create a task to parse the incoming query. In one embodiment, the parser 133 parses out the incoming query and compiles an execution plan. In some embodiments, the execution plan may include a graph of interrelated operations. In such embodiments, the graph may include a number of interrelated nodes corresponding to individual transactional or analytical tasks. The specific structure and organization of the nodes in the graph may or may not be optimal. Accordingly, graph of the execution plan may be sent to the optimizer 135 for optimization. In one embodiment, if the optimizer 135 determines that the query can be executed without partitioning any of the tasks into sub tasks that can be executed in parallel, e.g., a simple OLTP operation, then the graph may contain only a single task that can be executed using an active worker thread 137 operating on the database 125. The results of the query can then be returned to the receiver thread 131, which can then send the results back to client 105 through the network 107.

In other embodiments, the optimizer 135 may determine that one or more tasks in the graph can be partitioned into sub tasks that may be executed in parallel by multiple worker threads 137 to increase the performance of application 130. For example, the optimizer 135 may determine that the graph may include or represent an OLAP query or complex OLTP query. In such embodiments, the optimizer 135 may generate a new optimized task graph that includes nodes corresponding to one or more partitionable operations. The optimized task graph may then be sent to the scheduler 140 for processing.

Nodes in the graph are processed by available worker threads from all the worker threads 137. As used herein, "available worker thread" refers to a worker thread that has already been created and is currently not being used to handle or process a particular task. In one embodiment, as the graph is processed, the application 130 may determine that one of the constituent task nodes corresponds to a partitionable operation. To determine how many sub operations into which the partitionable operation 136 should be split, the scheduler 140 may analyze the availability of worker threads 137. Analysis of the availability of worker threads 137 may include determining the average of the recent number of available worker threads and/or the state of the originating query. Based on the analysis of the availability of worker threads 137, the scheduler 140 may then generate a concurrency level value. The concurrency level value may include a number of worker threads 137 that are currently, or are anticipated to be, available. The application 130, using the concurrency level value, may then generate a number of sub operations and generate new tasks corresponding to each of the sub operations that may be executed in parallel. The tasks of the execution plan, including the new tasks corresponding to the sub operations, can then be executed using available worker threads 137. Once all the tasks for a particular query are processed, the results can then be returned to the client 105 using receiver thread 130 to send electronic communications through network 107.

To synchronize the execution of tasks within the application 130, certain tasks block the corresponding worker thread using one or more types of the synchronization primitives 139. For instance, the synchronization primitive 139 may lock worker threads 137 at the application level. Similarly, although separate, the operating system 120 may also include a synchronization primitive 127 for handling synchronization among worker threads at the OS level. The use and functionality of the synchronization primitives 139 and 127 will be discussed in more detail below.

Task Scheduler and Worker Threads

Figure 2:
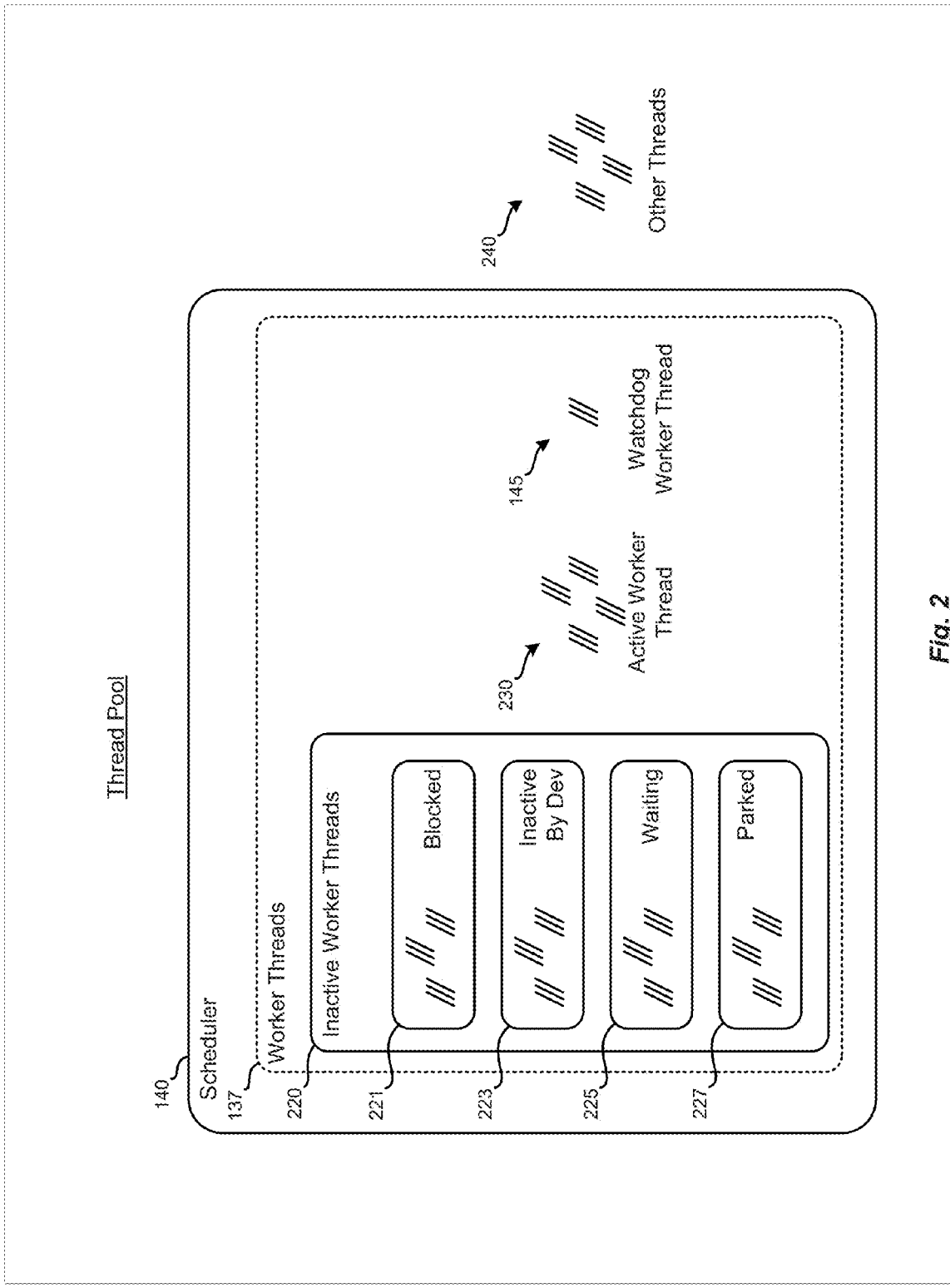
FIG. 2 is a schematic diagram of a task scheduler, according to embodiments of the present disclosure.

FIG. 2 is a block diagram of the scheduler 140. As illustrated, the scheduler 140 may include or control a number of worker threads 137. Worker threads 137 may include a number of inactive worker threads 220, active worker threads 230, and one or more watchdog worker threads 145. Active worker threads 230 represents threads that are currently executing or are available for executing tasks at the application level. Inactive worker threads 220 may represent a number of worker threads that may or may not be available to process tasks. For example, inactive worker threads 220 may include a number of blocked worker threads 221, explicitly inactive worker threads 223, waiting worker threads 225, and parked worker threads 227. Various embodiments of the present invention may also include other threads 240 that are not under the direct control of the scheduler 140 of the application 130. For example, the other threads 240 may be threads available only to the OS.

In some embodiments, the scheduler 140 may use each one of the types of inactive worker threads 220 strategically to optimize performance of the application 130. For example, in some scenarios, the OS level scheduler may be the first to know when a worker thread blocks after a system call for a synchronization primitive. The OS scheduler can then cede the corresponding computing resource to another thread waiting for a timeslot. However, within the context of the application 130, the OS scheduler does not have any knowledge about additional worker threads 137 to cede the corresponding computing resource to. Accordingly, blocked threads 221 would not be able to timeshare with other threads according to directions received from the OS scheduler. This can result in underutilization of computing resources. In addition, the OS scheduler may not know how a particular application 130 synchronizes tasks. If application 130 relies on the OS scheduler and uses a fixed concurrency level, i.e., a fixed number of worker threads, deadlock conditions may occur. For example, if a task in a higher order node requires a conditional variable from a code in a lower node, the lower node may not be scheduled in time. To avoid deadlocks and underutilization of computing resources, scheduler 140 may be configured to use a dynamic number of worker threads. As used herein, the number of worker threads may be described by concurrency level value. Accordingly, embodiments of the present disclosure relate to the dynamic adjustment of concurrency levels.

With respect to avoiding underutilization due to blocked threads, embodiments of the present disclosure may use the watchdog thread 145 to check periodically for blocked worker threads 221. If blocked threads 221 are detected, then the watchdog thread 145 or the scheduler 140 may activate additional worker threads that can be scheduled by the OS scheduler to process other tasks during the period of inactivity. In such embodiments, the application level scheduler 140 may cooperate with the OS scheduler by voluntarily adjusting the concurrency level and giving the OS control of the additional worker threads when needed to saturate the computing resources. Such embodiments leverage the advantages of task scheduling at the application level and at the OS level. Task scheduling at the application level ensures that the number of working threads is small enough so that costly computing resource context switches are avoided. By dynamically adjusting the concurrency level, embodiments the present disclosure can also leverage the capability of the OS scheduler to quickly cede the computing resources, e.g., the core, of the blocked worker thread to a new worker thread.

To detect blocked threads efficiently, the watchdog thread 145 does not use the OS synchronization primitives 127 directly. Rather, the application 130 may typically encapsulate the application level synchronization primitives 139 in user level platform-independent data structures. For example, some in-memory DBMS use a user level semaphore based on atomic instructions that may call the futex facilities of Linux when needed. Embodiments of the present disclosure may leverage these user level synchronization primitives to determine when a worker thread is about to call a system call that would potentially block the thread.

One example objective of using scheduler 140 is to dynamically maintain a concurrency level that is conducive to saturating the available computing resources. To evaluate the effectiveness of a current concurrency level, the scheduler 140 may evaluate the active concurrency level. The active concurrency level is defined as the difference between the concurrency level, i.e., the total number of worker threads, and the number of inactive worker threads. Accordingly, as worker threads stop being inactive, the active concurrency level or number of active worker threads can be greater than the number of computing resources.

In order to correct an imbalance between the active concurrency level and the available computing resources, the scheduler 140 may preempt a worker thread once it finishes a given task. However, instead of deleting the worker thread, the scheduler 140 may suspend the worker thread as a parked worker thread 227. In some embodiments, the watchdog thread 145 may monitor the active concurrency level. If the active concurrency level gets too low, then the scheduler 140 or the watchdog thread 145 may activate parked worker threads 227 to compensate. Utilizing parked worker threads 227 is advantageous because it avoids the computational resource costs of creating new worker threads.

Apart from the blocked worker threads 221 and the parked worker threads 227, embodiments of the present disclosure may also include two additional states of inactive worker threads 220. For example, the inactive worker threads 220 may also include waiting working threads 225. Waiting working threads 225 may include working threads that are waiting for another task in the graph to complete. Other embodiments may include mechanisms that allow developers to explicitly define regions of code as inactive using inactive by developer worker threads 223. Inactive by developer worker threads 223 are useful for sections of code that are not computing resource-intensive.

Data Structures Used by the Scheduler

To support efficient scheduling of all heterogeneous general-purpose tasks, embodiments of the present disclosure may include a scheduler 140 that does not require or process any priority execution information about the tasks. However, in some embodiments, the scheduler 140 may utilize directed acyclic graphs (DAG) that define correlations and the order of operations of a set of tasks. In some embodiments, the DAG can take any form as long as it includes a single root node. Each node in the task graph may correspond to any particular operation. In some embodiments, any particular node may spawn a new task graph, or issue itself again to the scheduler 140. Developers are free to coordinate synchronization among the tasks. In one embodiment, task graphs can be assigned a priority that can be used to determine a decreased or increased probability of the task graph being chosen from the queue for execution. The root node can then be sent to the scheduler 140 or a task graph queue to wait for execution.

Figure 3:
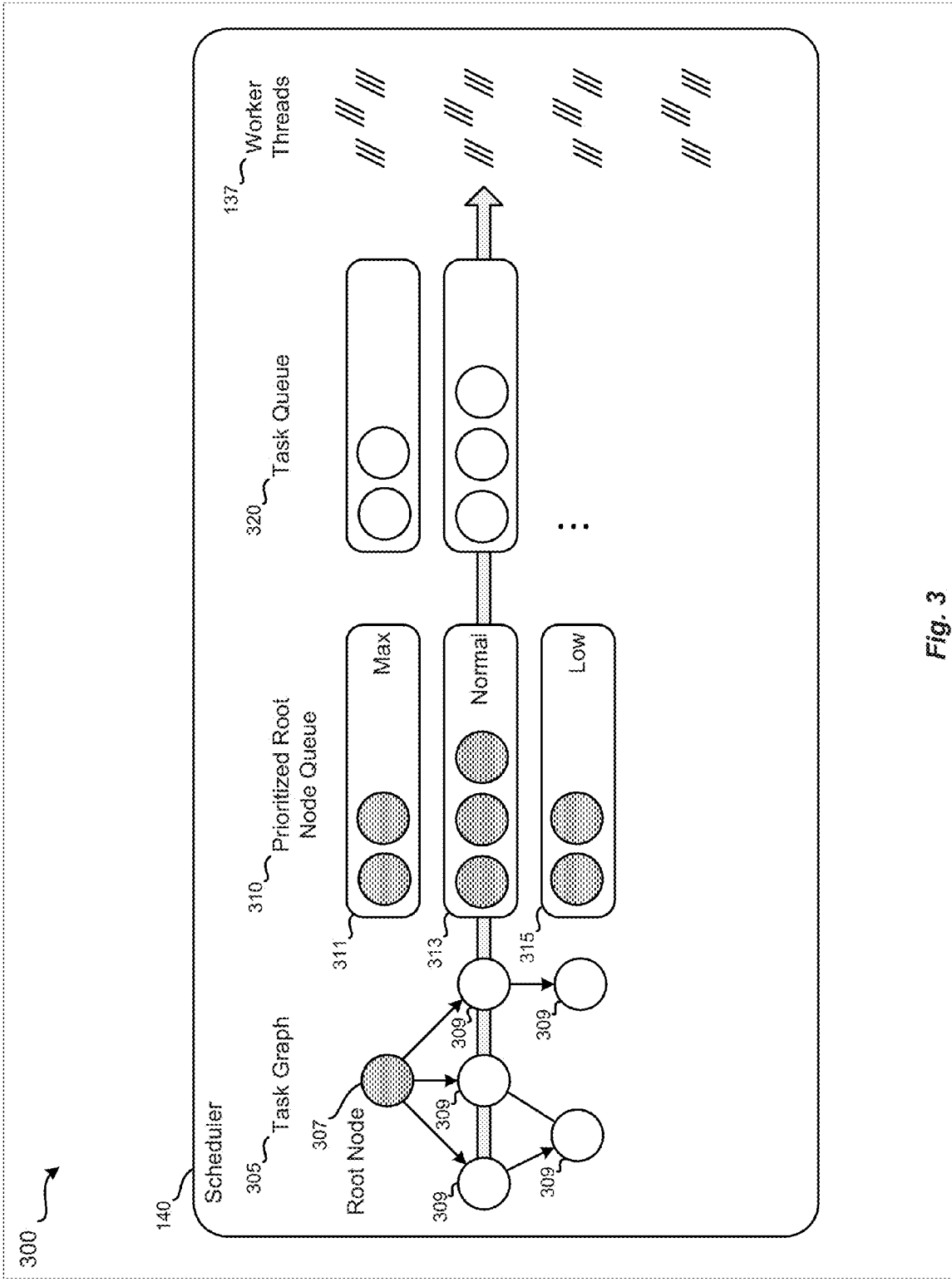
FIG. 3 is a schematic diagram of data structures used by a task scheduler for dynamic adjustment of concurrency levels and dynamic adjustment of task granularity, according to embodiments of the present disclosure.

In one embodiment, the scheduler 140 may maintain two sets of queues, as depicted in FIG. 3. The first set of queues may include one queue per priority level to handle the order of the root nodes 307 of the submitted task graphs 305 that have not yet been initiated for execution. The second set of queues may be a task queue 320 that may include queues for handling the non-root nodes 309 to be executed. In one embodiment, the scheduler 140 may use the task queue 320 as the main distributed task queue. Task queues 320 may be sorted by node tier depth in order to favor execution of the deep-running graphs. Scheduler 140 may use distributed task queues to reduce synchronization inside the scheduler 140, while using task stealing for load balancing among the task queues.

When the task queues 320 are empty, a free worker thread may retrieve a root node from the prioritized root node queue 310, with a probability that favors prioritized root nodes. In response to executing the root node, the scheduler 140 may issue the constituent non-root nodes randomly to the task queues 320 for load balancing or issue the constituent non-root nodes with a directive for efficient cache usage. For constituent non-root nodes issued with cache-efficiency priority, each task in the queue may be correlated to a "socket" in a cache-coherent non-uniform memory access (ccNUMA) architecture. Thus, new tasks may be placed in the task queue of the socket where the current thread is running to increase the probability that the new tasks will be able to reuse data retrieved by the previously executed task that have not yet been invalidated in the cache. When the task queues 320 are not empty, an available worker thread may retrieve the next task from the task queues 320 in a global cyclical manner. However, when cache-efficient task distribution is used to assign tasks to the queues, the available worker thread may retrieve a task from the queue that is correlated to the socket on which it is running. If the task queue is empty, the worker thread will search the other task queues, in order of increasing NUMA distance. When a non-root node 309 is executed, the worker thread may check which descendant nodes are ready for execution. Descendent nodes that are ready for execution can then be dispatched to the task queues 320.

As discussed herein, watchdog threads 145 may be implemented by the scheduler 140 to control other worker threads 137 and to monitor the state of execution of various queries, task graphs, and tasks. The watchdog thread 145 can be configured to wake up periodically to gather information and potentially control other worker threads. For example, the watchdog thread 145 can use statistical counters for monitoring various states such as the number of waiting and executing tasks, how many tasks each worker thread has executed, etc. Such counters may be updated by each worker thread 137 and/or the watchdog thread 145.

Dynamic Adjustment of Concurrency Levels

Figure 4:
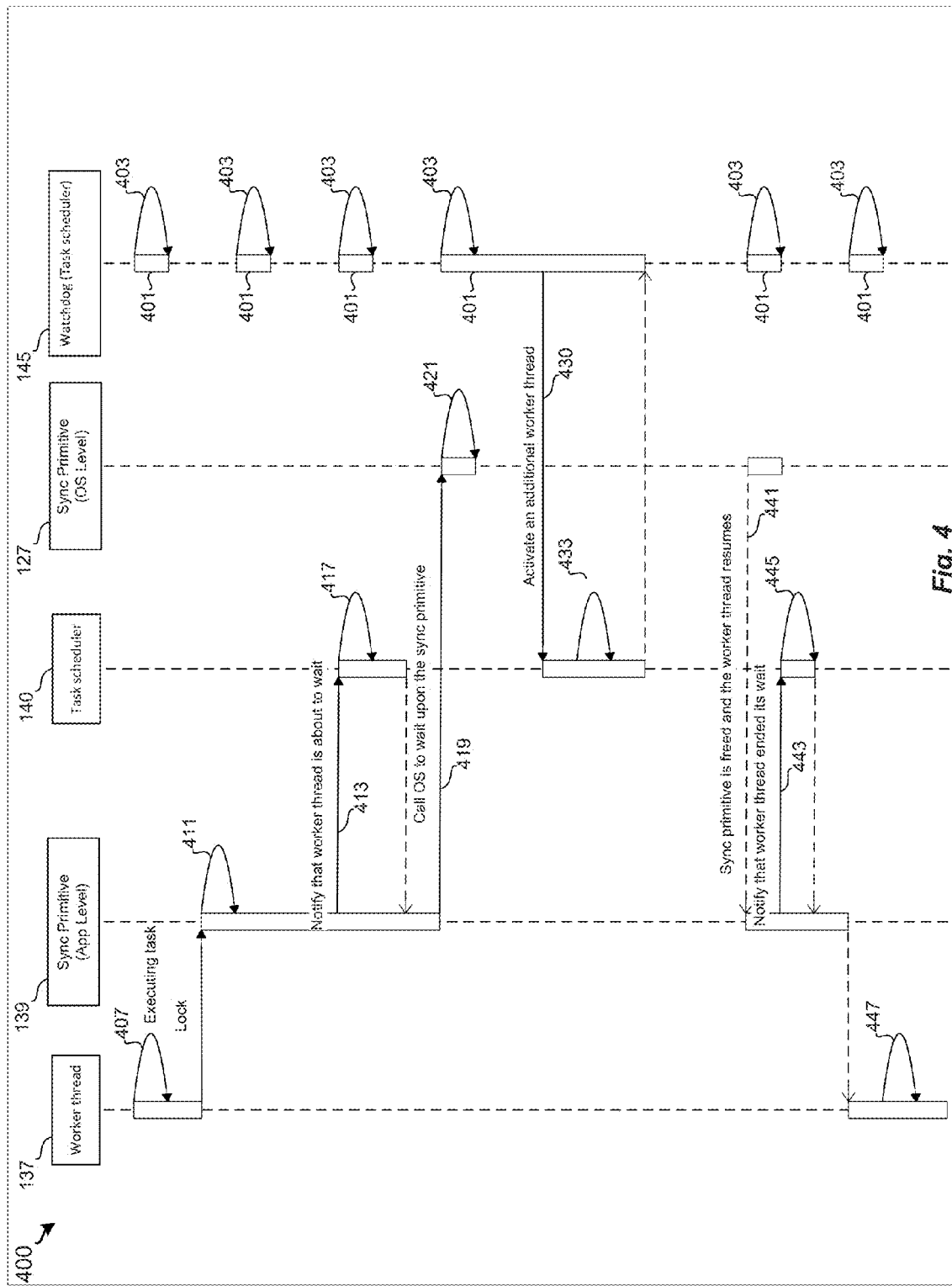
FIG. 4 is flowchart of a method for dynamic adjustment of concurrency levels, according to embodiments of the present disclosure.

FIG. 4 is a flowchart of method 400 for dynamic adjustment of concurrency levels. As shown, all of the steps may be executed by one or more of the constituent functional elements of application 130. As previously discussed, application 130 may include a DBMS. Accordingly, all of the actions of FIG. 4 may be performed by a single or distributed computer system executing computer executable code that causes the computer system to implement the functionality of the application 130. Method 400 may begin with a worker thread 137 executing a task in action 407. In one embodiment, executing the task in action 407 may result in the worker thread 137 initiating a lock message 409. The lock message 409 may be sent to the synchronization primitive 139. If the synchronization primitive is free, then the worker thread 137 can lock the synchronization primitive 139 and return a response to the worker thread 139 immediately. However, if the synchronization primitive 139 is busy, and the worker thread 137 needs to wait until the synchronization primitive 139 is released. In such scenarios, the synchronization primitive 139 can send a notification 413 to the task scheduler 140 that the worker thread 137 is waiting. In response, the task scheduler 140 can register that one more worker thread is blocked a system call, in action 417. In one embodiment, registering that additional worker threads blocked in the system call may include increasing a counter value.

Once the task scheduler 140 registers the increase in the worker threads blocked in a system call, the synchronization primitive 139 can send a call 419 to the operating system to wait for the synchronization primitive 127. The worker thread 137 can then wait during process 421 until the OS level synchronization primitive is free. Alternatively, the watchdog thread 145 can determine in action 403-4 that active concurrency level is equal to the number of cores in the multicore processor minus one. In response to this determination, the watchdog thread 145 can activate one or more of the inactive worker threads 220. The watchdog thread 145 can then send an activation notification 430 to the task scheduler 140 that an additional worker thread has been activated. In response to the notification 430, the task scheduler 140 may record information about newly available worker threads 137.

Watchdog thread 145, as indicated in actions 403, may periodically activate to check the state of scheduler 140 and to take any appropriate actions in response. Such actions may include activating additional worker threads when there are available inactive worker threads. In some embodiments, if the period during which a particular thread is blocked is too short, i.e. shorter than the period 401 during which the watchdog thread 145 is active, the watchdog thread 145 will not realize the active concurrency level has changed. Consequently, the watchdog thread 145 will not initiate or activate additional worker threads. The period of watchdog thread activity 401 can be set to prevent briefly blocked working threads from triggering activation of an excessive number of worker threads that could result in inefficient context switches.

In one embodiment, the OS level synchronization primitive 127 can return a message 441 to the application level synchronization primitive 139 that is free and that the worker thread 137 can resume. The application level synchronization primitive 139 can send notification 443 to the task scheduler 140 that the thread is no longer waiting. In response to the notification that the worker thread 137 is no longer blocked, the task scheduler 140 may decrease the count in the counter tracking the number of worker threads blocked in a system call, in action 445. The worker thread 137 may then continue executing the task in action 447.

Dynamic Adjustment of Task Granularity

Figure 5:
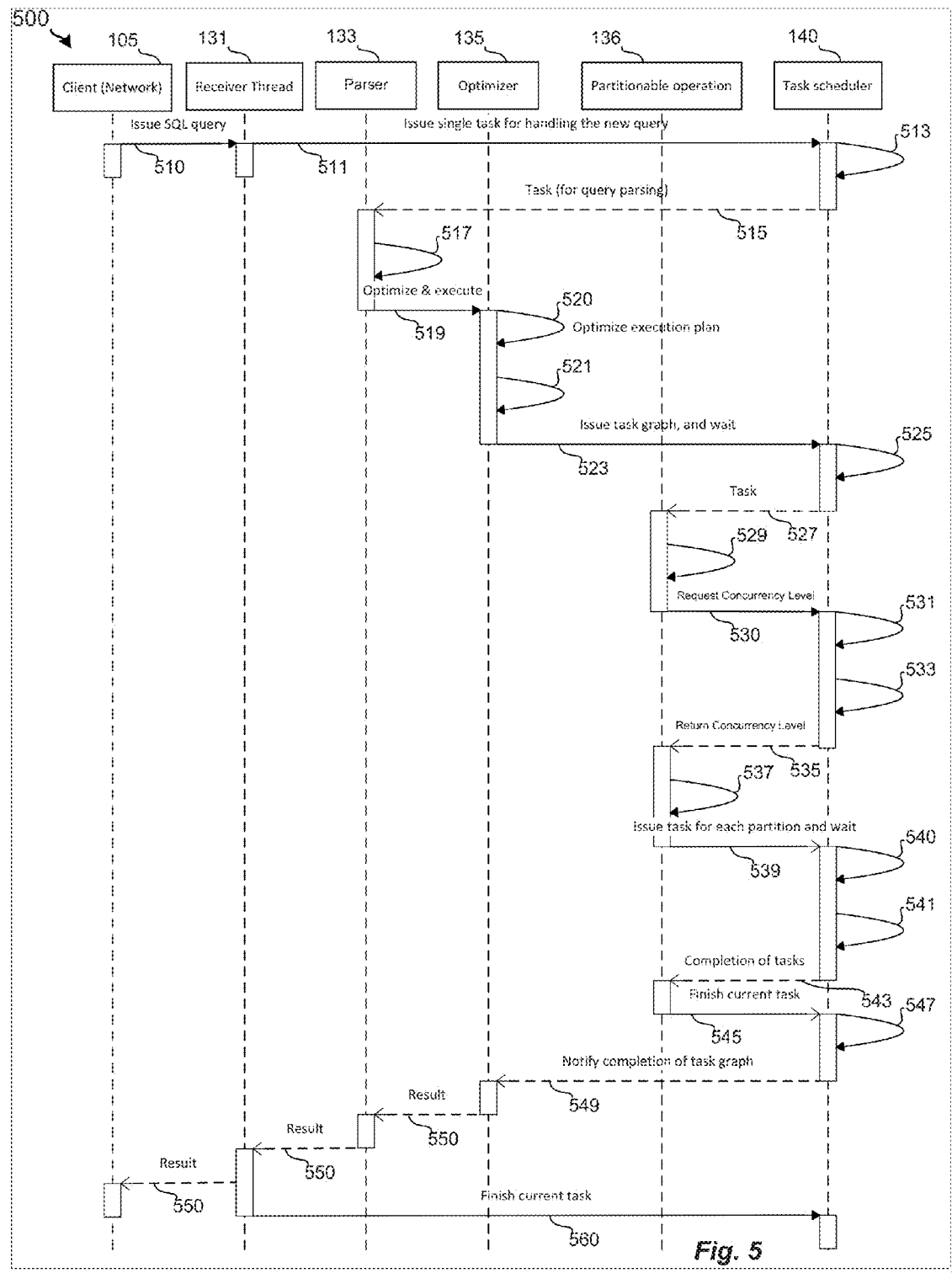
FIG. 5 is flowchart of a method for dynamic adjustment of task granularity, according to embodiments of the present disclosure.

FIG. 5 is a flowchart of a method 500 for adjusting the task granularity of a partitionable function that can be partitioned into individual parallel operations. In one embodiment, method 500 can begin with client 105 issuing a query 510. The receiver thread 131 may receive the query 510 and issue a single task 511 for handling the new query to the task scheduler 140. As described herein, the receiver thread 131, parser 133, optimizer 135, partitionable operation 136, and task scheduler 140 may be all implemented as functionality in a computer system executing one or more pieces of computer executable code. Accordingly, all actions performed by the receiver thread 130, parser 133, optimizer 135, partitionable operation 136 and the task scheduler 140 may all be performed by a single or distributed computer system.

In response to receiving the single task 511 for handling the new query, the task scheduler 140 may wait in action 513 until a worker thread 137 is available. When a worker thread 137 becomes available, the task scheduler 140 may issue and execute a task 515 using the available worker thread for parsing the query in parser 133. In response to the task for parsing the query 515, the parser 130 can parse the query and compile an execution plan. As discussed herein, the execution plan may include a graph of nodes corresponding to various operations for answering query. Once the execution plan is compiled, the parser 133 can send a request 519 to the optimizer 135 to optimize and execute the execution plan. The optimizer 135 may then optimize the execution plan in action 520. In some embodiments, the optimizer 135 can determine that no operations in the execution plan can be partitioned for parallel execution. In such scenarios, the execution plan may be executed in the currently operating worker thread and return the result to the receiver thread 131, which can in turn forwarded to the client 105.

However, in other embodiments the optimizer 135 may determine that one or more of the operations in the execution plan may be implemented in parallel sub operations. For example, one of the nodes of the execution plan, or task graph, may correspond to an operation that can be processed on the underlying database 125 in a partitioned manner. For example, the operation may be split up into several parallel operations that can operate on different segments of data within the database 125. In such scenarios, the optimizer 135 can send the task graph 523 to the task scheduler 140. In some embodiments, sending the task graph 523 to the task scheduler 140 may include sending the root node 307 of the task graph 305 to the prioritized root node queue 310 handled by the task scheduler 140. In response to the task graph 305, the task scheduler 140 may wait for one or more available worker thread 137 to handle the tasks 309 of the graph 305. As the available worker threads 137 process the tasks of a particular task graph 305, the worker thread 137 or the task scheduler

140 may determine that one or more of the tasks may be partitioned for parallel execution in action 525.

Once it is determined that one of the tasks can be partitioned for parallel execution, the scheduler 140 may issue a task 527 to create partitionable operation 136. In action 529, a preliminary number of partitions may be calculated. In some embodiments the calculation of the preliminary approximation for parallel partitioned operations may be based on heuristics of the data to be processed. Accordingly, estimates for the required computing resources for each partition of the operation may be determined For example, the number of cores 151 in the multicore processor 150 may be references. In some embodiments, to better determine the optimal number of partition, the partionable operation 136 may generate and send request 530 to the task scheduler 140 for an estimated concurrency level value. In process 531, the task scheduler can analyze the availability of computing resources and/or worker threads. For example, the task scheduler can evaluate the exponential average of the recent number of available worker threads and/or the state of the query. The state of the query may include its depth, priority, and how long the query has been executing. In process 533. The task scheduler 140 may a calculate currency level for the corresponding partitionable operation 136. In one embodiment, the concurrency level may include the average available worker threads in the recent history according to the exponential average monitored by the task scheduler 140.

The task scheduler 140 may then send concurrency level value 535 to the partitionable operation 136. In response, the partitionable operation 136, or the worker thread 137 executing the particular partitionable operation 136, may calculate the actual number of partitions needed for parallel execution using available worker threads 137. In some embodiments, the concurrency level value may be used as the upper bound for the number of partitions. The partitionable operation 136 can then issue a task for each of the partitioned operations in message 539. As available worker threads are executing the partitioned operation in parallel in action 541, the task scheduler 140 can monitor the actual computing resource and worker thread usage and update internal statistics for the query in process 540. For example, the task scheduler 140 may track the query depth, time, and required computing resources. Once all of the tasks of the partitioned operations are complete, the task scheduler 140 may return a completion of tasks message 543 which triggers the initiation of the finish current task message 545. In response to the finished current task message 545, the task scheduler 140 may send notification 549 of the completion of the task graph when all of the other tasks in the graph are completed in action 547. The optimizer 135, the parser 130, the receiver thread 131 can then forward on the results 550 back to the client 105.

Figure 6:
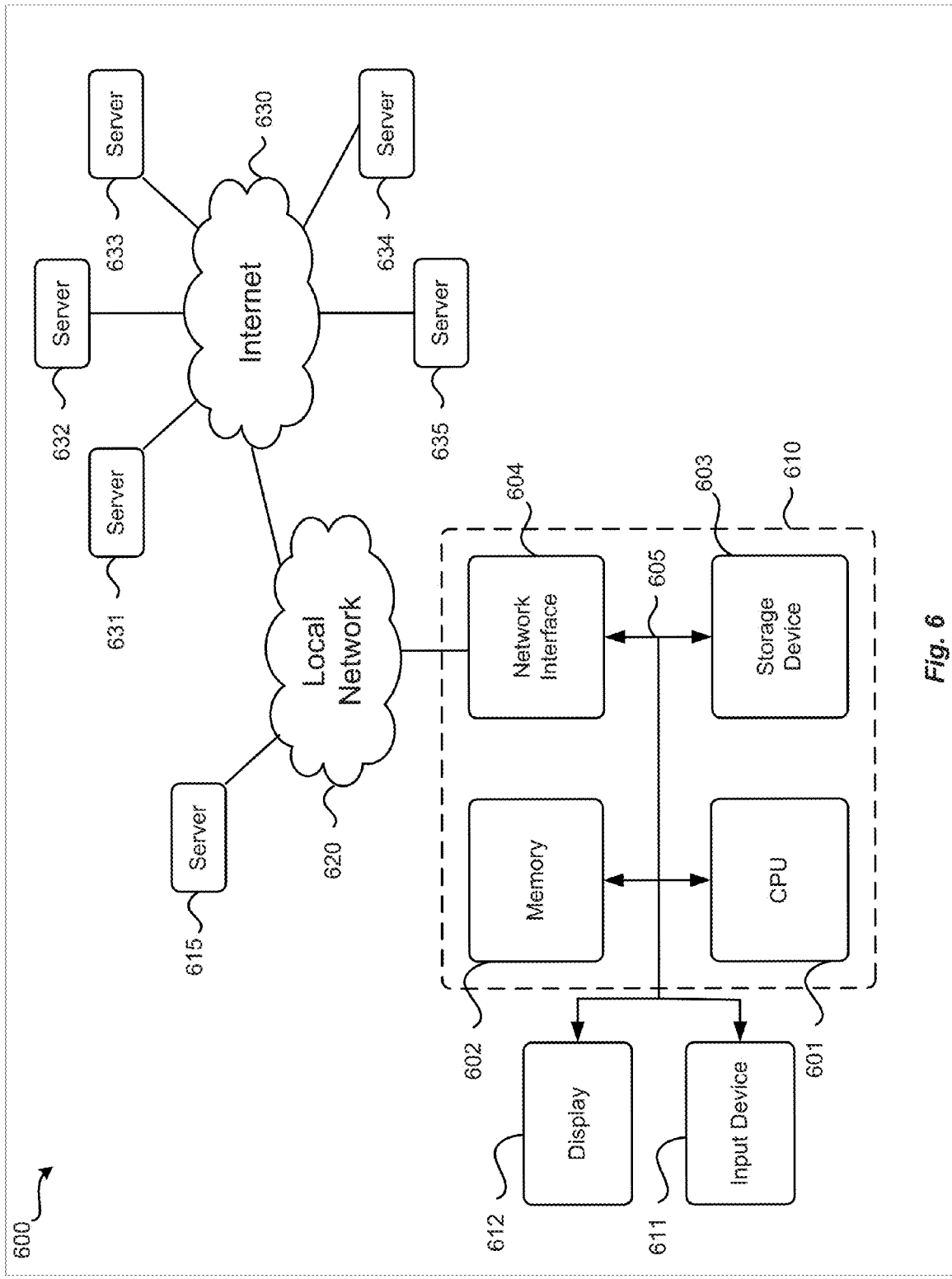
FIG. 6 illustrates an example computer system that can be used to implement various embodiments of the present invention.

FIG. 6 illustrates an example computer system and networks that may be used to implement one embodiment of the present disclosure. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including instructions for performing the techniques described above. This memory may also be used for storing temporary variables or other intermediate information during execution of instructions to be executed by processor 601. Possible implementations of this memory may be, but are not limited to, random access memory (RAM), read only memory (ROM), or both. A storage device 603 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 610 may be coupled via the same or different information bus, such as bus 605, to a display 612, such as a cathode ray tube (CRT), touchscreen, or liquid crystal display (LCD), for displaying information. An input device 611 such as a keyboard and/or mouse is coupled to a bus for communicating information and command selections from the user to processor 601. The combination of these components allows the user to communicate with the system.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may distributed across multiple different computer systems 610 or servers 631 across the network. Software components described above may be implemented on one or more servers. A server 631 may transmit messages from one component, through Internet 630, local network 620, and network interface 604 to a component or container on computer system 610, for example. Software components of a composite application may be implemented on the same system as other components, or on a different machine than other software components. This process of sending and receiving information between software components or one or more containers may be applied to communication between computer system 610 and any of the servers 631 to 635 in either direction. It may also be applied to communication between any two servers 631 to 635.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   activating, by a computer system, a plurality of worker threads,
   receiving, by the computer system, a query;
   processing, by the computer system, the query in a first thread in the plurality of worker threads to generate a parsing task associated with the query;

parsing, by the computer system, the query based on the parsing task to generate an execution plan comprising a plurality of ordered operations for answering the query;

generating, by the computer system, a task graph comprising a plurality of task nodes corresponding to the plurality of ordered operations, based on the execution plan;

identifying, by the computer system, a first task node in the plurality of task nodes corresponding to a first ordered operation in the plurality of ordered operations determined to be partitionable into sub operations that can be executed in parallel;

generating, by the computer system, a concurrency level value that corresponds to an availability of worker threads in the plurality of worker threads, wherein generating the concurrency level value comprises calculating an average number of available worker threads in the plurality of worker threads over a period of time; and generating, by the computer system, a plurality of partitioned tasks that can be executed in parallel based on the first task node and the concurrency level value, wherein the concurrency level value is the upper limit for the number of partitioned tasks.

2. The method of claim 1 further comprising:

executing, by the computer system, the plurality of partitioned tasks in the plurality of worker threads;

executing, by the computer system, the plurality of task nodes in the plurality of worker threads; and tracking, by the computer system, the availability of worker threads while the plurality of partitioned tasks and the plurality of task nodes are executing.

3. The method of claim 1, wherein generating the concurrency level value is further based on a state of the query.

4. The method of claim 1, wherein the query is an SQL query for information contained in a database.

5. The method of claim 1 further comprising:

instantiating, by the computer system, a data base management system (DBMS) application, wherein activating the plurality of worker threads comprises activating the plurality of worker threads inside the DBMS application;

determining, by the computer system, that at least one of the plurality of worker threads is blocked; and allocating an additional worker thread at an operating system level of the computer system.

6. The method of claim 5, wherein allocating the additional worker thread comprises activating a previously inactive worker thread or creating a new worker thread.

7. The method of claim 1, wherein receiving the query comprises receiving the query from a client, the method further comprising sending results of the query to the client.

8. A non-transitory computer readable medium comprising instructions, that when executed by a processor cause the processor to be configured for:

activating a plurality of worker threads based, receiving a query, processing the query in a first thread in the plurality of worker threads to generate a parsing task associated with the query;

parsing the query based on the parsing task to generate an execution plan comprising a plurality of ordered operations for answering the query;

generating a task graph comprising a plurality of task nodes corresponding to the plurality of ordered operations, based on the execution plan;

identifying a first task node in the plurality of task nodes corresponding to a first ordered operation in the plurality of ordered operations determined to be partitionable into sub operations that can be executed in parallel;

generating a concurrency level value that corresponds to an availability of worker threads in the plurality of worker threads, wherein generating the concurrency level value comprises calculating an average number of available worker threads in the plurality of worker threads over a period of time; and generating a plurality of partitioned tasks that can be executed in parallel based on the first task node and the concurrency level value, wherein the concurrency level value is the upper limit for the number of partitioned tasks.

9. The non-transitory computer readable medium of claim 8, wherein the instructions further cause the processor to be configured for:

executing the plurality of partitioned tasks in the plurality of worker threads;

executing the plurality of task nodes in the plurality of worker threads; and tracking the availability of worker threads while the plurality of partitioned tasks and the plurality of task nodes are executing.

10. The non-transitory computer readable medium of claim 8, wherein generating the concurrency level value is further based on a state of the query.

11. The non-transitory computer readable medium of claim 8, wherein the query is an SQL query for information contained in a database.

12. The non-transitory computer readable medium of claim 8, wherein the instructions further cause the processor to be configured for:

instantiating a data base management system (DBMS) application, wherein activating the plurality of worker threads comprises activating the plurality of worker threads inside the DBMS application;

determining that at least one of the plurality of worker threads is blocked; and allocating an additional worker thread at an operating system level of the computer system.

13. The non-transitory computer readable medium of claim 12, wherein allocating the additional worker thread comprises activating a previously inactive worker thread or creating a new worker thread.

14. The non-transitory computer readable medium of claim 8, wherein receiving the query comprises receiving the query from a client, wherein the instructions further cause the processor to be configured for sending results of the query to the client.

15. A system comprising:

a computer processor;

a non-transitory computer readable medium coupled to the computer processor and comprising instructions, that when executed by the computer processor cause the computer processor to be configured to:

activate a plurality of worker threads, receive a query, process the query in a first thread in the plurality of worker threads to generate a parsing task associated with the query;

parse the query based on the parsing task to generate an execution plan comprising a plurality of ordered operations for answering the query;

generate a task graph comprising a plurality of task nodes corresponding to the plurality of ordered operations, based on the execution plan;

identify a first task node in the plurality of task nodes corresponding to a first ordered operation in the plurality of ordered operations determined to be partitionable into sub operations that can be executed in parallel;

generate a concurrency level value that corresponds to an availability of worker threads in the plurality of worker threads, wherein generating the concurrency level value comprises calculating an average number of available worker threads in the plurality of worker threads over a period of time; and generate a plurality of partitioned tasks that can be executed in parallel based on the first task node and the concurrency level value, wherein the concurrency level value is the upper limit for the number of partitioned tasks.

16. The system of claim 15, wherein the instructions further cause the computer processor to be configured to:

execute the plurality of partitioned tasks in the plurality of worker threads;

execute the plurality of task nodes in the plurality of task nodes; and track the availability of worker threads while the plurality of partitioned tasks and the plurality of task nodes execute.

17. The system of claim 15, wherein the concurrency level value is further based on a state of the query.

18. The system of claim 15, wherein the instructions further cause the computer processor to be configured to:

instantiate a data base management system (DBMS) application, wherein activating the plurality of worker threads comprises activating the plurality of worker threads inside the DBMS application;

determine that at least one of the plurality of worker threads is blocked; and allocate an additional worker thread at an operating system level of the computer system.

19. The system of claim 18, wherein the instructions that cause the computer processor to be configured to allocate the additional worker thread comprises instructions that cause the computer processor to be configured to activate a previously inactive worker thread or create a new worker thread.

20. The system of claim 15, wherein receiving the query comprises receiving the query from a client, wherein the instructions further cause the computer processor to be configured for sending results of the query to the client.

* * * * *